United States Patent
Klein (10) Patent No.: US 9,112,728 B2
(45) Date of Patent: Aug. 18, 2015

(54) IMPLEMENTING CONTROL PLANES FOR HYBRID NETWORKS

(75) Inventor: Philippe Klein, Jerusalem (IL)

(73) Assignee: BROADCOM CORPORATION, Irvine, CA (US)

( * ) Notice: Subject to any disclaimer, the term of this patent is extended or adjusted under 35 U.S.C. 154(b) by 67 days.

(21) Appl. No.: 13/484,423

(22) Filed: May 31, 2012

(65) Prior Publication Data
US 2013/0322445 A1 Dec. 5, 2013

(51) Int. Cl.
H04L 12/64 (2006.01)
H04L 12/54 (2013.01)

(52) U.S. Cl.
CPC .................................. *H04L 12/5692* (2013.01)

(58) Field of Classification Search
USPC ......................................................... 370/392
See application file for complete search history.

(56) References Cited

U.S. PATENT DOCUMENTS

| 7,327,722 | B1 * | 2/2008 | Pipher et al. | 370/352 |
| 7,545,739 | B1 | 6/2009 | Bugenhagen | |
| 2004/0018016 | A1 * | 1/2004 | O'Mahony et al. | 398/43 |
| 2007/0153815 | A1 | 7/2007 | She et al. | |
| 2008/0049621 | A1 * | 2/2008 | McGuire et al. | 370/236.2 |
| 2011/0044173 | A1 * | 2/2011 | Kakadia et al. | 370/238 |
| 2012/0113871 | A1 * | 5/2012 | Bulusu | 370/256 |
| 2012/0207163 | A1 * | 8/2012 | Schrum | 370/392 |

FOREIGN PATENT DOCUMENTS

| KR | 10-2010-0074019 | 7/2010 |
| KR | 10-1134791 | 4/2012 |

OTHER PUBLICATIONS

U.S. Appl. No. 13/152,454, filed Jun. 3, 2011. (** Copy not provided).
European Search Report in co-pending, related EP Application No. 12 00 6412, mailed Oct. 14, 2013.
Korean Search Report in co-pending, related KR Application No. 12-2012-0108076, mailed Oct. 25, 2013.

* cited by examiner

*Primary Examiner* — Yemane Mesfin
*Assistant Examiner* — Jeff Banthrongsack
(74) *Attorney, Agent, or Firm* — Foley & Lardner LLP (57) ABSTRACT

Disclosed are various embodiments for implementing a control plane in hybrid networks. A coordinated shared network may correspond to a distributed bridge, and a control plane may be implemented in one of the nodes of the coordinated shared network. A hybrid network may support multiple heterogeneous networking technologies. A hybrid network device, such as a gateway, may support multiple different coordinated shared networks, each corresponding to distributed bridges. The control planes for the distributed bridges may be implemented in the hybrid network device.

20 Claims, 10 Drawing Sheets

IMPLEMENTING CONTROL PLANES FOR HYBRID NETWORKS

BACKGROUND

Many different types of technologies exist for home networking. Some homes have Category 5e or better unshielded twisted pair (UTP) cabling running to various locations, and the Institute of Electrical and Electronics Engineers (IEEE) 802.3 Ethernet may be communicated over this type of cable. However, many homes may not be wired for Ethernet, and it may be cost prohibitive to add such wiring. IEEE 802.11 Wi-Fi is an alternative that allows for wireless home networking, but it may be susceptible to degraded performance due to interference, distance, line-of-sight obstructions, etc. Multimedia over Coax Alliance (MoCA) provides standards for networking over coaxial cable, which may already be present in rooms for television service. Power line communication (PLC) standards, such as, e.g., IEEE 1901, HomePlug AV, etc., provide for networking over alternating current (AC) power wiring, which may be available at any power outlet. Due to the differing characteristics of the various networking technologies, a home is likely to employ multiple technologies.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

The present disclosure relates to implementing control planes for hybrid networks, such as those that may be found in homes, small businesses, or similar environments. Such environments may simultaneously employ a variety of heterogeneous networking technologies, such as coaxial cable networks (e.g., MoCA, etc.), power line networks (e.g., IEEE 1901, HomePlug AV, etc.), Wi-Fi wireless networks, Ethernet networks, and so on. Some or all of these networking technologies may provide coordinated shared networks (CSN), which control access to a shared communications medium by a coordinator to prevent collisions between packets. In a coordinated shared network, the rules of forwarding are duplicated to a forwarding engine on each node. A hybrid network utilizes two or more of these heterogeneous networking technologies to connect various network devices.

Although a hybrid network may include network devices that support only one networking technology (e.g., Ethernet, Wi-Fi, etc.), a hybrid network will include one or more hybrid network devices that support two or more heterogeneous networking technologies. The hybrid network devices may include an abstraction layer that is capable of switching data from one network segment using one networking technology to another network segment using another networking technology. One example of a hybrid network device may be a gateway that is used to connect the hybrid network to an external network (e.g., the Internet, an intranet, etc.). The external network connection may be Ethernet, digital subscriber line (DSL), coaxial cable modem, and so on.

Typically, a hybrid network may correspond to a mesh networking model. In a mesh model, each node having multiple ports corresponds to a bridge. Under a mesh model, all nodes may be considered to be equal participants in the network, which means that each node should maintain the same network topology database. Also, each node should implement the same bridging firmware and/or software. Accordingly, the mesh model poses interoperability challenges and presents limited scalability.

Various embodiments of the present disclosure may implement coordinated shared networks as layer 2 bridges within a hybrid network. In some embodiments, the hybrid network abstraction layer may also be implemented as a layer 2 bridge. Various techniques for treating a coordinated shared network as a bridge are disclosed in U.S. patent application Ser. No. 13/152,454 entitled "SYSTEMS AND METHODS FOR IMPLEMENTING A CONTROL PLANE IN A DISTRIBUTED NETWORK" and filed on Jun. 3, 2011, which is incorporated by reference herein in its entirety. When treating a coordinated shared network as a bridge, a control plane may be emulated in one of the nodes.

In various examples, the existing bridged network technologies for Ethernet (e.g., Shortest Path Bridging (IEEE 802.1aq), etc.) may be leveraged for a hybrid network. Hybrid network devices in such a network may be agnostic with regard to the underlying technology used in a coordinated shared network. The model presented herein is scalable and may result in a reduced duplication of resources. The model may be optimal for a server/client networking scheme, e.g., having some "heavy" nodes and some "light" nodes on the network.

Figure 1:
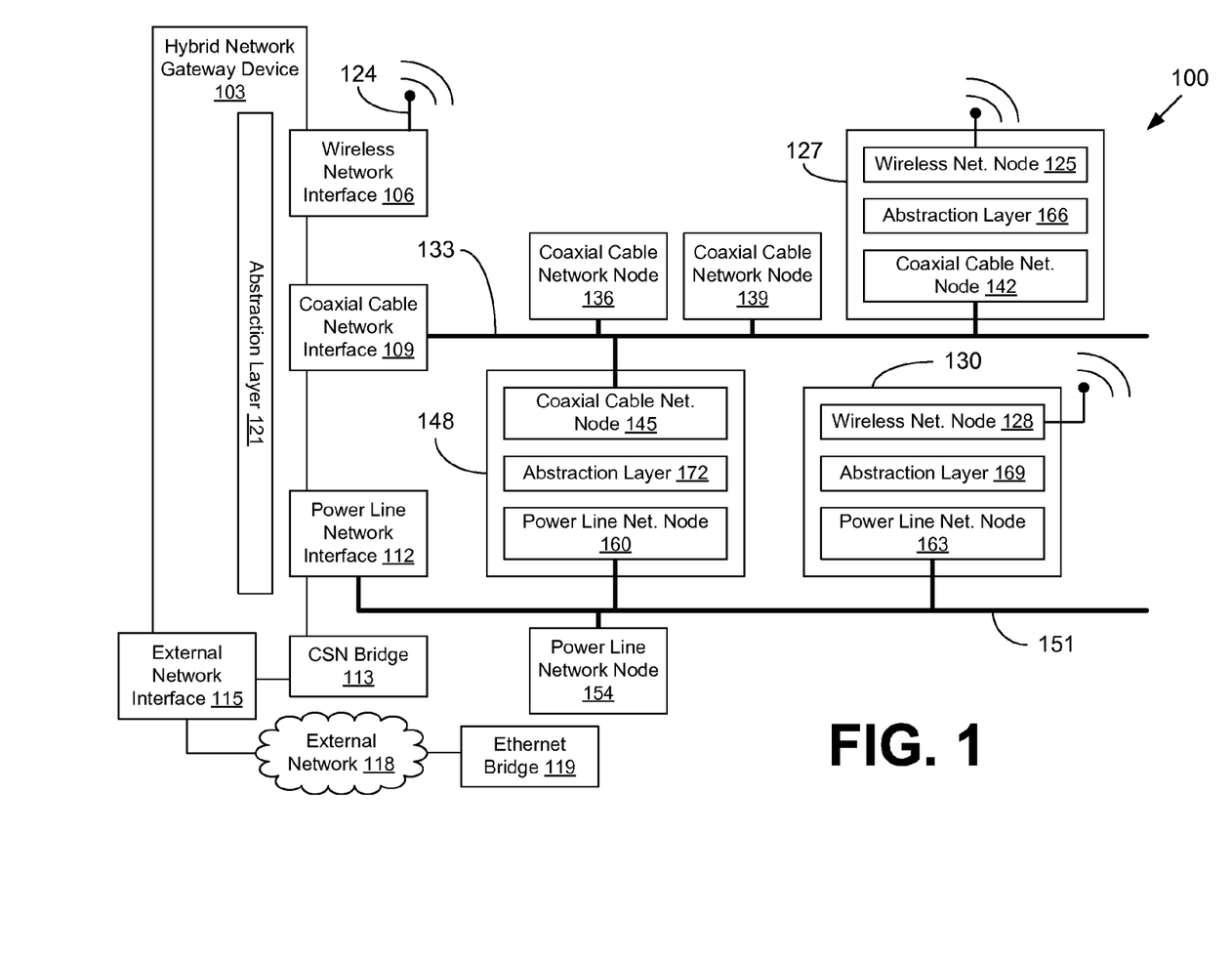
FIG. 1 depicts a diagram of an exemplary hybrid network according to various embodiments of the present disclosure.

FIG. 1 depicts a diagram of an exemplary hybrid network 100 according to various embodiments of the present disclosure. The hybrid network 100 includes a hybrid network gateway device 103. The hybrid network gateway device 103 may include a variety of internal network interfaces, for example, a wireless network interface 106, a coaxial cable network interface 109, a power line network interface 112, and/or other interfaces. An interface to one or more CSN bridges 113 may be provided in the hybrid network gateway device 103 as will be described in further detail in FIG. 2B.

The hybrid network gateway device 103 may include one or more external network interfaces 115, which may be coupled to an external network 118, such as the Internet, an intranet, etc. The external network 118 may be coupled to one or more Ethernet bridges 119. The hybrid network gateway device 103 may perform, for example, routing functions, firewalling functions, network address translation (NAT) functions, and other functions. In addition, the hybrid network gateway device 103 may include an abstraction layer 121 to abstract access to and from the internal network interfaces (i.e., the wireless network interface 106, the coaxial cable network interface 109, and the power line network interface 112).

The wireless network interface 106 may be coupled to one or more wireless networks 124. The wireless networks 124 may be, for example, Wi-Fi at 2.4 GHz, Wi-Fi at 5 GHz, and/or other types of wireless networks 124. A wireless network 124 may, for example, correspond to a basic service set (BSS), extended service set (ESS), or other grouping. The wireless network interface 106 may be coupled to a wireless network node 125 in a hybrid network device 127, a wireless network node 128 in a hybrid network device 130, and/or other nodes by way of one wireless network 124. The wireless network interface 106, though typically an access point (AP), may correspond to a station (STA) in some embodiments. Likewise, the wireless network nodes 125 and 128 may correspond to APs and/or STAB.

The coaxial cable network interface 109 may be coupled to a coaxial cable network 133 including, for example, coaxial cable network nodes 136 and 139, a coaxial cable network node 142 in the hybrid network device 127, a coaxial cable network node 145 in a hybrid network device 148, and/or other coaxial cable network nodes. The coaxial cable network 133 may employ MoCA or another technology to use coaxial cable that may be existing within the environment, e.g., for cable television, satellite television, over-the-air television, etc. In some cases, the coaxial cable network 133 may coexist on a coaxial cable with television services and/or other data services.

The power line network interface 112 may be coupled to a power line network 151 including, for example, power line node 154, a power line node 160 in the hybrid network device 148, a power line node 163 in the hybrid network device 130, and/or other nodes. The power line network 151 may employ IEEE 1901, HomePlug AV, and/or other technologies.

The hybrid network devices 127, 130, and 148 may correspond to routers, switches, bridges, general-purpose computing devices, and/or other devices. Similarly to the hybrid network gateway device 103, each of the hybrid network devices 127, 148, and 130 may include an abstraction layer 166, 169, or 172, respectively. The abstraction layers 166, 169, and 172 may be operable to deliver packets to or from an upper layer source and/or to switch packets between the various network interfaces that may be present.

It is understood that the specific configuration of the hybrid network 100 in FIG. 1 is provided merely as an example for discussion purposes and is not intended to be limiting. Different configurations with different and types of nodes and hybrid network devices may be employed as desired. To illustrate implementing a control plane in a coordinated shared network, an exemplary Ethernet bridge and an exemplary coordinated shared network will next be discussed.

Figure 2A:
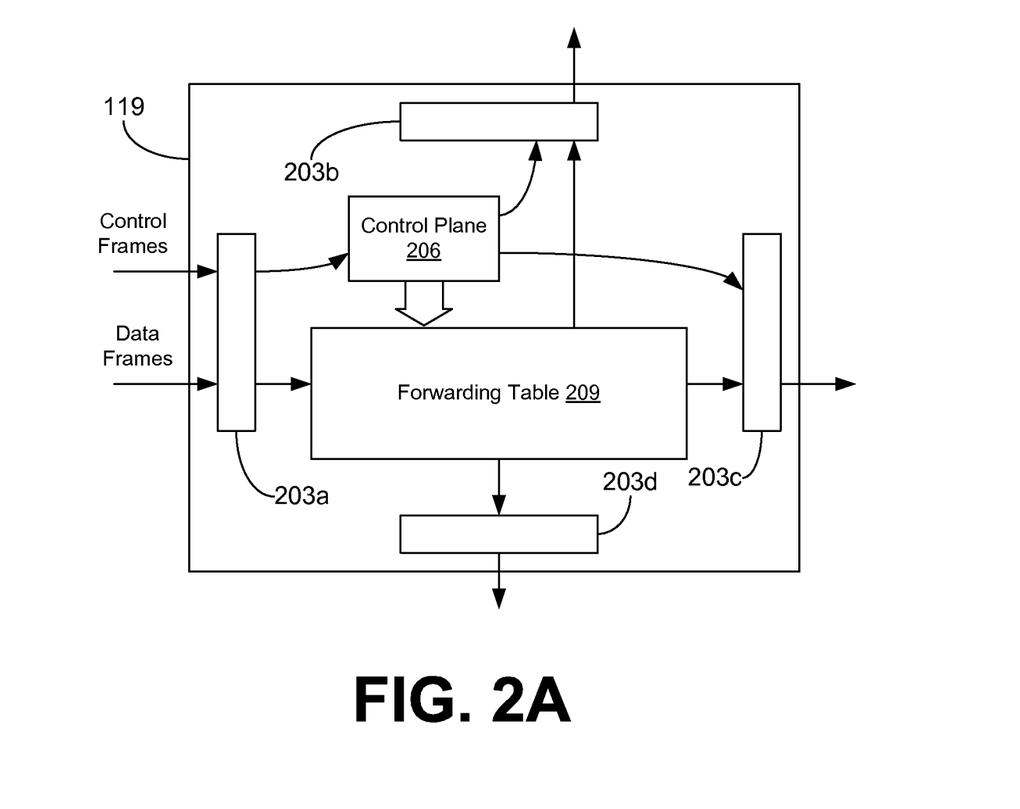
FIG. 2A depicts a diagram of an exemplary Ethernet bridge which may be employed in the hybrid network of FIG. 1 according to various embodiments of the present disclosure.

FIG. 2A depicts a diagram of an exemplary Ethernet bridge 119 which may be employed in the hybrid network 100 of FIG. 1 according to various embodiments of the present disclosure. The Ethernet bridge 119 includes four ports 203a, 203b, 203c, and 203d, a control plane 206, a forwarding table 209, and/or other components. Control frames and data frames may enter through the ports 203. For example, control frames and data frames are illustrated as entering through port 203a in FIG. 2A. The data frames may correspond to unicast frames having one destination, multicast frames having multiple destinations, and/or broadcast frames to be routed to all nodes. The control frames are routed to the control plane 206, which configures the forwarding table 209 according to the control frames. The control plane 206 may route the control frames and generate new control frames that are sent to the other ports 203b, 203c, and/or 203d. The control plane 206 may also control the ports 203a, 203b, 203c, and/or 203d.

Figure 2B:
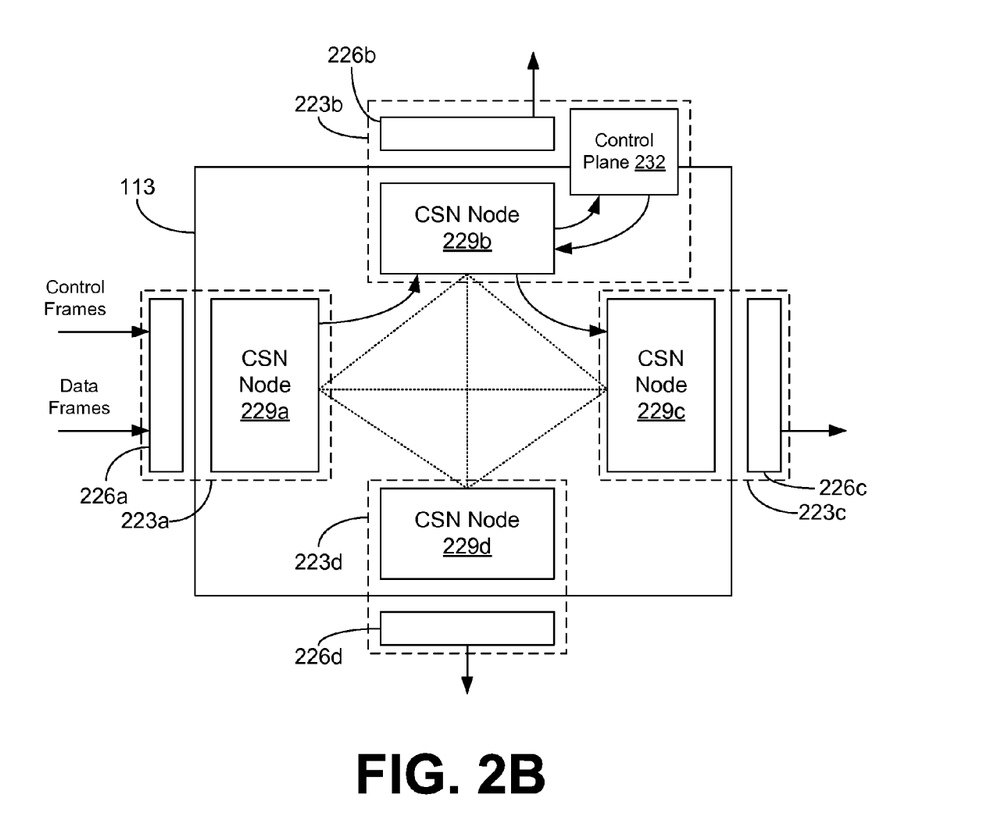
FIG. 2B depicts a diagram of an exemplary coordinated shared network (CSN) bridge which may be employed in the hybrid network of FIG. 1 according to various embodiments of the present disclosure.

FIG. 2B depicts a diagram of an exemplary CSN bridge 113 which may be employed in the hybrid network 100 of FIG. 1 according to various embodiments of the present disclosure. The CSN bridge 113 is a coordinated shared network that functionally corresponds to the Ethernet bridge 119 of FIG. 2A. To this end, the CSN bridge 113 includes four hybrid network devices 223a, 223b, 223c, and 223d, which correspond to the four ports 203a (FIG. 2A) of the Ethernet bridge 119. Each of the respective hybrid network devices 223 also has a respective Ethernet port 226a, 226b, 226c, or 226d and a respective CSN node 229a, 229b, 229c, or 229d on the coordinated shared network. A corresponding abstraction layer may manage forwarding between the respective Ethernet port 226 and the respective CSN node 229. Although the CSN bridge 113 is described with identical types of hybrid network devices 223, the CSN bridge 113 may include different network devices, including, for example, some which may be connected only to the CSN or to one or more other CSNs.

A control plane 232 for the CSN bridge 113 is implemented in the hybrid network device 223b, but the control plane 232 may be implemented for any of the CSN nodes 229 as desired. Control frames and data frames may enter through the ports 226 or be generated by the CSN nodes 229. For example, control frames and data frames are illustrated as entering through port 226a in FIG. 2B. The data frames may correspond to unicast frames having one destination, multicast frames having multiple destinations, and/or broadcast frames to be routed to all nodes. The control frames are routed to the control plane 232 by way of the CSN node 229b.

The control plane 232 configures a distributed forwarding table in the coordinated shared network according to the control frames by sending configuration messages to the CSN nodes 229. The control plane 232 may route the control frames and generate new control frames that are sent to the other CSN nodes 229a, 229c, and/or 229d, for forwarding by via the Ethernet ports 226a, 226c, and/or 226d. The control plane 232 may also control the ports of the CSN bridge 113 by sending commands to the nodes 229a, 229c, and/or 229d through CSN management frames.

In various embodiments, the control plane 232 may execute a rapid spanning tree protocol or other protocol to exchange information among bridges to avoid routing loops. Also, in various embodiments, the control plane 232 may perform bandwidth reservation functionality for audio, video, or other services.

Figure 3A:
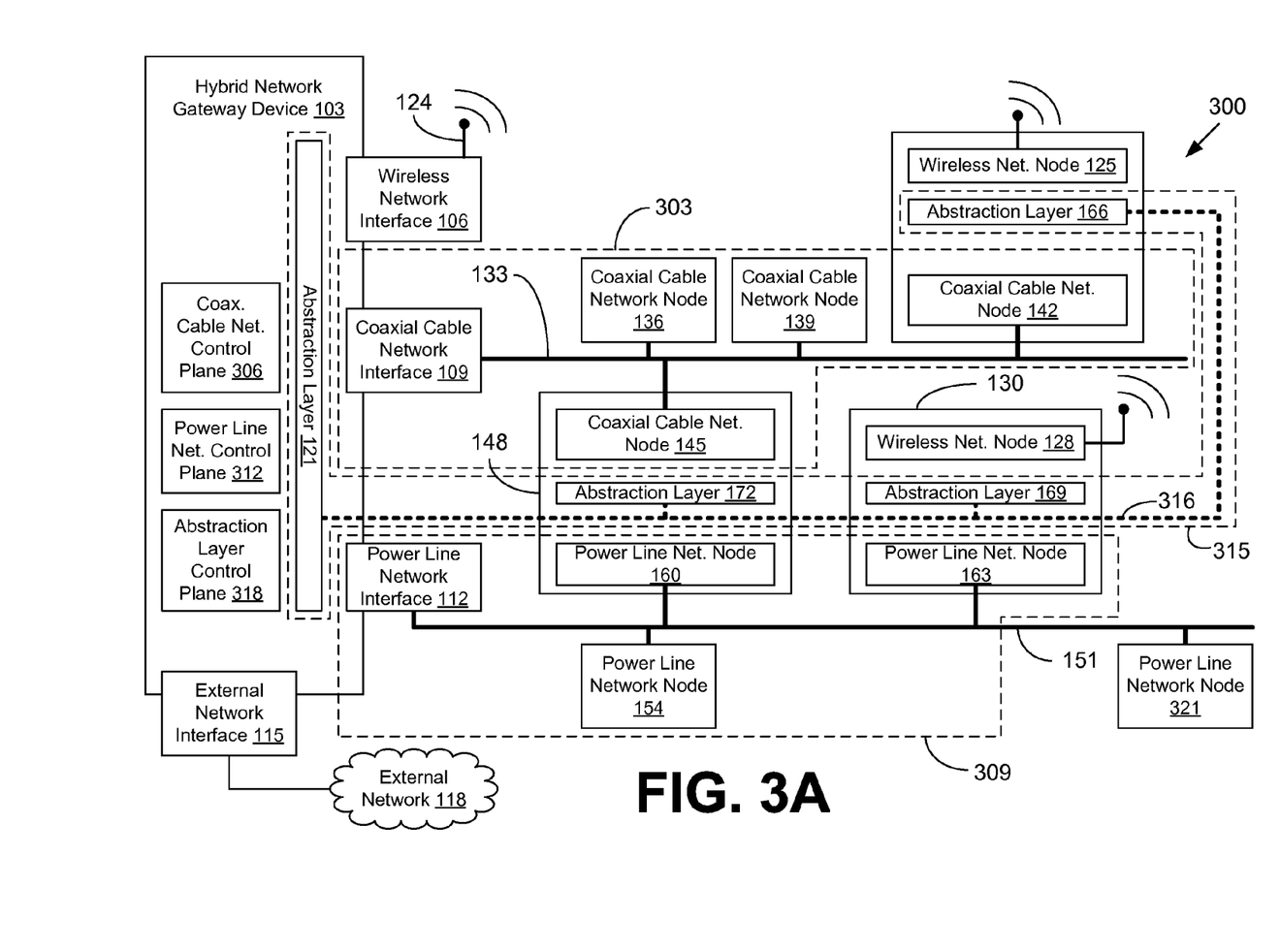
FIG. 3A shows an exemplary hybrid network incorporating CSN bridges as shown in FIG. 2A according to various embodiments of the present disclosure.

FIG. 3A shows an exemplary hybrid network 300 incorporating CSN bridges 115 as shown in FIG. 2A according to various embodiments of the present disclosure. The hybrid network 300 employs a similar arrangement to the hybrid network 100 (FIG. 1), but the coaxial cable network 133 and the power line network 151 are configured as CSN bridges 115, with the respective control planes being implemented in the hybrid network gateway device 103.

For the coaxial cable network bridge 303, the coaxial cable network control plane 306 is implemented in the hybrid network gateway device 103. In the coaxial cable network bridge 303, the coaxial cable network interface 109 and the coaxial cable network nodes 136, 139, 142, and 145 may be viewed as ports of the bridge. Control frames for the coaxial cable network 133 are routed to the coaxial cable network control plane 306, which then sends configuration messages to configure the distributed forwarding tables at each of the coaxial cable network interface 109 and the coaxial cable network nodes 136, 139, 142, and 145.

In the coaxial cable network bridge 303, the nodes are linked together through a common medium, e.g., one or more coaxial cables connected together. The control frames and forwarded data frames are both transported on the common medium. The coaxial cable network bridge 303 may have a single control plane and a single data plane, so that any node may be capable of forwarding a frame to any other node of the coaxial cable network bridge 303.

For the power line network bridge 309, the power line network control plane 312 is implemented in the hybrid network gateway device 103. In the power line network bridge 309, the power line network interface 112 and the power line network nodes 154, 160, and 163 may be viewed as ports of the bridge. Control frames for the power line network 151 are routed to the power line network control plane 312, which then sends configuration messages to configure the distributed forwarding tables at each of the power line network interface 112 and the power line network nodes 154, 160, and 163.

In the power line network bridge 309, in contrast to the coaxial cable network bridge 303, it may be the case that not every node may be reached by any other node. However, all nodes of the power line network bridge 309 are visible to the network coordinator. The control frames and forwarded data frames are both transported on the power line medium. The power line network bridge 309 may have a single control plane. The data plane of the power line network bridge 309 may be divided into multiple dynamic forwarding partitions defined by reachability among nodes. In one embodiment, frames are forwarded within a partition but not between partitions.

Additionally, the abstraction layers 121, 166, 169, and 172 may be viewed as ports on an abstraction layer bridge 315, where the ports are connected by a virtual link 316. For the abstraction layer bridge 315, an abstraction layer control plane 318 may be implemented in the hybrid network gateway device 103. Accordingly, the abstraction layer control plane 318 may send configuration messages to configure distributed forwarding tables at each of the abstraction layers 121, 166, 169, and 172. The control messages for the abstraction layer bridge 315 are transported by the underlying networks to which the abstraction layers 121, 166, 169, and 172 are connected. Because this encapsulation is transparent to the abstraction layers, the abstraction layer bridge 315 maintains a single logical control plane. The data plane for the abstraction layer bridge 315 may be divided into multiple static forwarding partitions. The partitions are defined by the physical topology of the underlying network interfaces connected to a given abstraction layer. In one embodiment, data frames are forwarded within partitions but not between partitions.

It may be the case that any of the coordinated shared networks which are treated as bridges may additionally have nodes that are not controlled by the corresponding control plane for the coordinated shared network. In such cases, these external nodes may themselves be viewed as standalone bridges to which control frames and data frames may be routed. In the non-limiting example of FIG. 3A, the power line network 151 includes a power line node 321 which is treated as a standalone bridge which is not encompassed by the power line network bridge 309. Although the power line node 321 is not controlled by the power line network control plane 312, the power line network bridge 309 exchanges routing protocol information and/or other data via bridge-to-bridge communication in control frames.

Figure 3B:
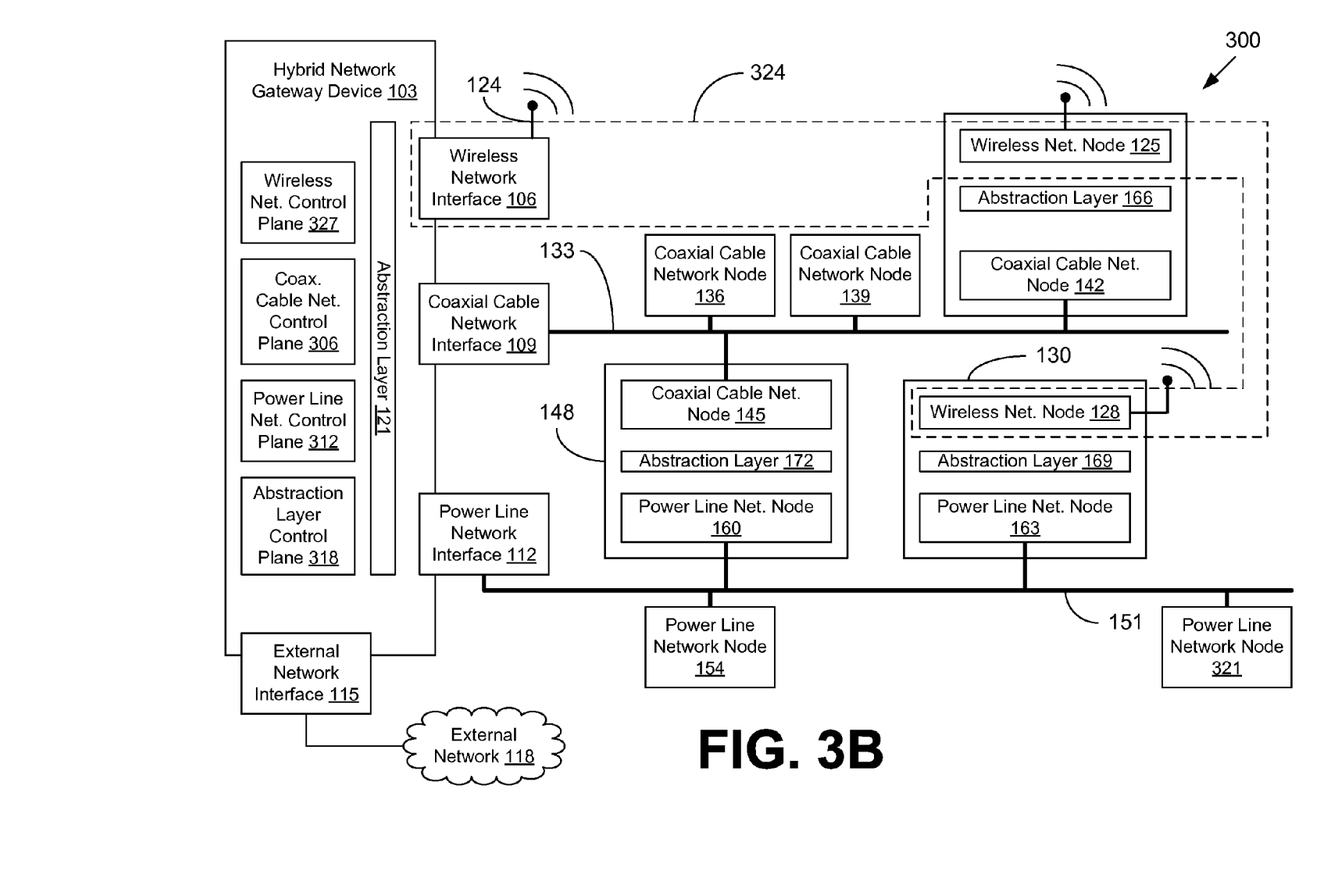
FIG. 3B shows the exemplary hybrid network of FIG. 3A with a wireless network bridge according to various embodiments of the present disclosure.

FIG. 3B shows the exemplary hybrid network 300 of FIG. 3A with a wireless network bridge 324 according to various embodiments of the present disclosure. Like the other coordinated shared network bridges depicted in FIG. 3A, the wireless network bridge 324 facilitates treatment of the wireless network 124 as a bridge. A wireless network control plane 327 may be included in the hybrid network gateway device 103 or in other network devices coupled to the wireless network 124. According to embodiments, any node on the wireless network 124 may participate in the wireless network bridge 324, irrespective of whether the particular node is an access point (AP) or a station (STA). In another embodiment, a STA may be unable to participate in the wireless network bridge 324. In some cases, a STA may be treated as a standalone bridge.

Figure 4:
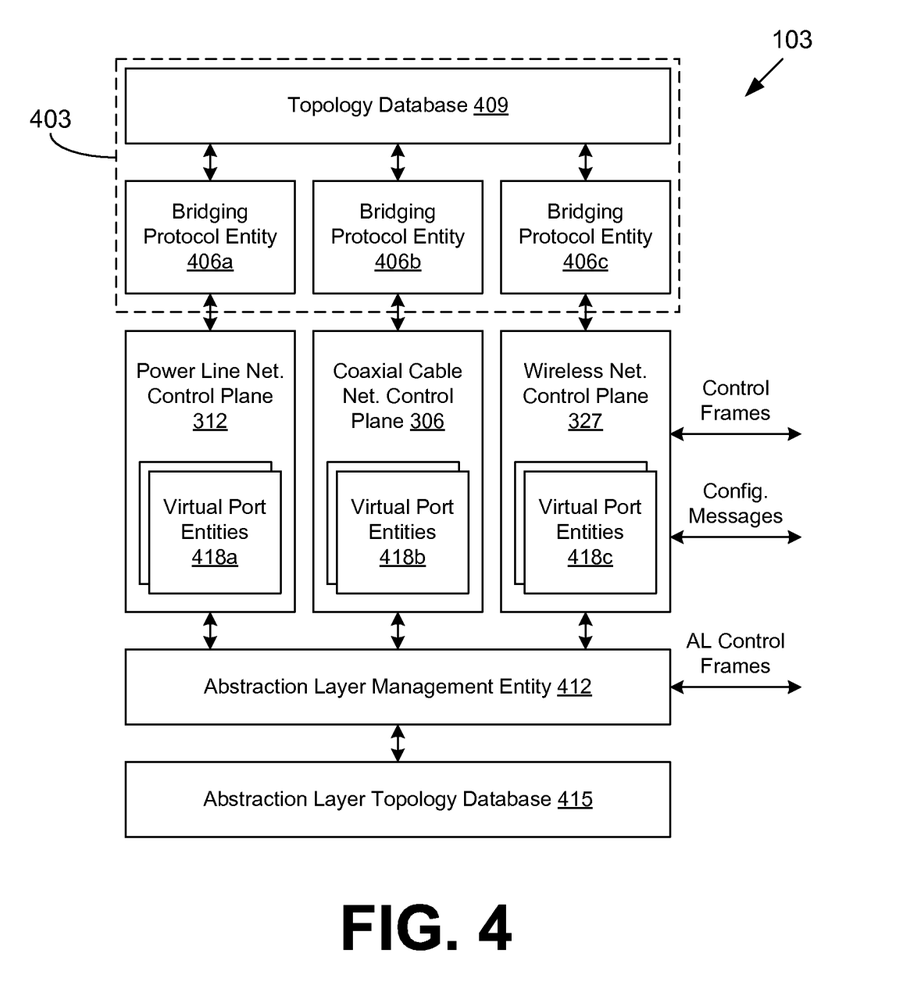
FIG. 4 depicts an exemplary portion of the hybrid network gateway device employed in the exemplary hybrid network of FIGS. 3A and 3B according to various embodiments of the present disclosure.

FIG. 4 depicts an exemplary portion of the hybrid network gateway device 103 employed in the exemplary hybrid network 300 of FIGS. 3A and 3B according to various embodiments of the present disclosure. The hybrid network gateway device 103 includes, for example, a coaxial cable network control plane 306, a power line network control plane 312, and a wireless network control plane 327. Each of these control plane entities may be in communication with layer 2 bridging protocol logic 403.

The layer 2 bridging protocol logic 403 may include, for example, a plurality of bridging protocol entities 406a, 406b, and 406c as well as a shared topology database 409. Each of the bridging protocol entities 406 may execute a bridging protocol such as, for example, IEEE 802.1aq shortest path bridging (SPB) or another bridging protocol. In the non-limiting example of FIG. 4, a separate bridging protocol entity 406 is shown for each control plane entity. However, the bridging protocol entities 406 may all be instances of the same bridging protocol. Since the topology database 409 is maintained by all of the bridges of the hybrid network 300, the bridging protocol entities 406 co-hosted on the hybrid network gateway device may share the same topology database 409. In one non-limiting example, the topology database 409 is an intermediate system to intermediate system (IS-IS) database.

The coaxial cable network control plane 306, the power line network control plane 312, and the wireless network control plane 327 may each be in communication with an abstraction layer management entity 412, which may comprise an abstraction layer control plane 318 (FIG. 3A). The abstraction layer management entity 412 may be in communication with an abstraction layer topology database 415. In some embodiments, the coaxial cable network control plane 306, the power line network control plane 312, and the wireless network control plane 327 may each have one or more respective virtual port entities 418a, 418b, or 418c. The virtual port entities 418 facilitate interoperability by extending the CSN bridge to nodes on the coordinated shared network that have an abstraction layer but do not support configuration messages from the control plane of the coordinated shared network. Such nodes may be detected by the coaxial cable network control plane 306, the power line network control plane 312, and/or the wireless network control plane 327 from information queried from the abstraction layer topology database 415.

In operation, the coaxial cable network control plane 306, the power line network control plane 312, and the wireless network control plane 327 each send and receive routing protocol control frames to and from other bridges in the hybrid network 300. Additionally, the coaxial cable network control plane 306, the power line network control plane 312, and the wireless network control plane 327 are each configured to send configuration messages to other participating nodes on the coordinated shared network, which are viewed as ports of the CSN bridge 113 (FIG. 2B). It is noted that the hybrid network gateway device 103 optimizes the bandwidth of the hybrid network 300 by eliminating inter-bridge traffic overhead between nodes. By hosting all of the control plane entities within the gateway, inter-bridge communications are maintained as internal to the gateway.

Further, the abstraction layer management entity 412 may be configured to send and receive abstraction layer control frames to other abstraction layer entities. In one embodiment, the virtual port entities 418 facilitate configuration of nodes on the coordinated shared network which are not capable of being configured by the control plane using the control plane configuration messages. Instead, the virtual port entities 418 facilitate configuration of these nodes by way of the abstraction layer management entity 412. The abstraction layer management entity 412 sends abstraction layer configuration commands in the abstraction layer control frames to nodes on the coordinated shared network which are in a network device having an abstraction layer.

Figure 5:
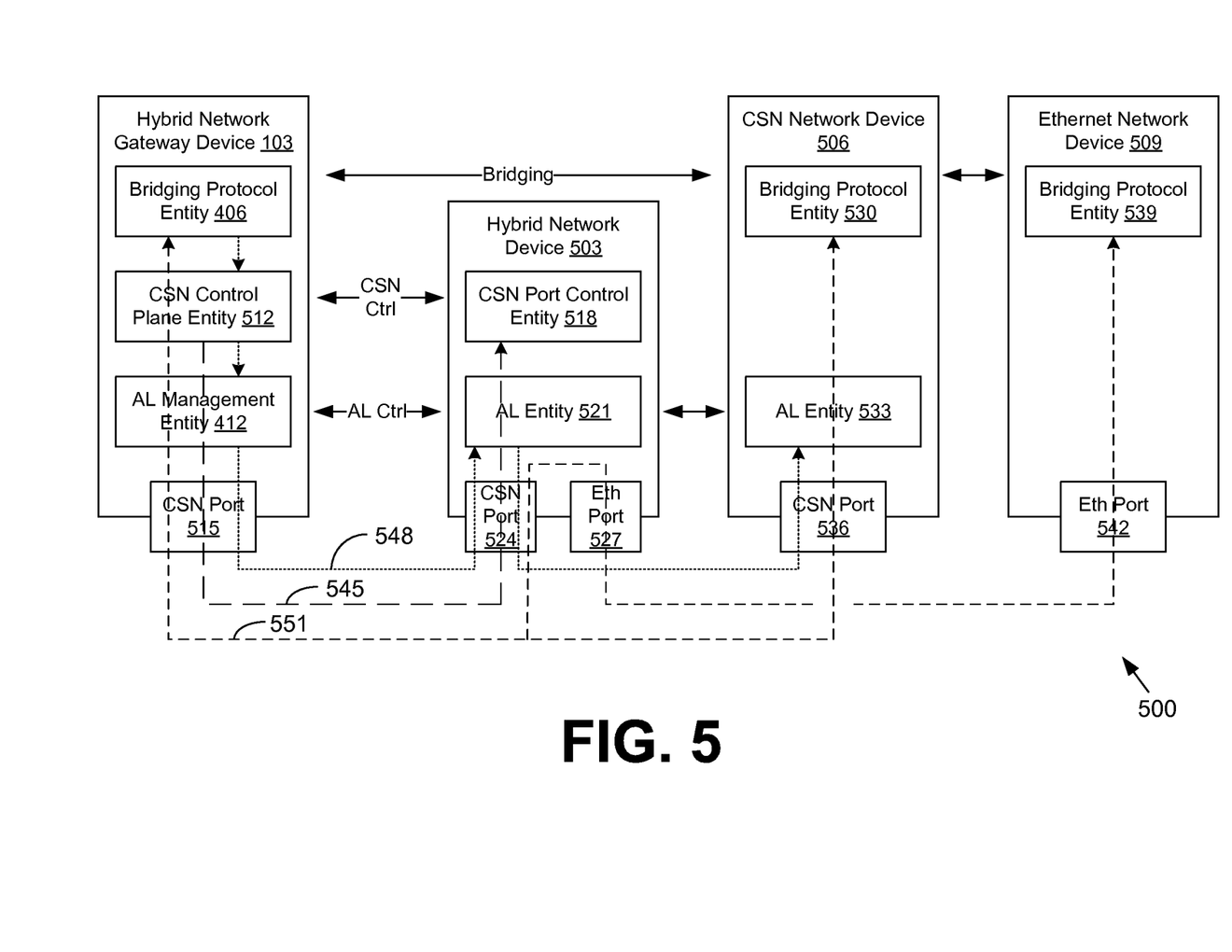
FIG. 5 is a communication diagram showing exemplary communication among different types of nodes in the exemplary hybrid network of FIGS. 3A and 3B according to various embodiments of the present disclosure.

FIG. 5 is a communication diagram 500 showing exemplary communication among different types of nodes in the exemplary hybrid network 300 of FIGS. 3A and 3B according to various embodiments of the present disclosure. Specifically, the communication diagram 500 depicts communication between a hybrid network gateway device 103, a hybrid network device 503, a CSN network device 506, and an Ethernet network device 509 on the hybrid network 300.

The hybrid network device 503 includes, for example, a bridging protocol entity 406, a CSN control plane entity 512 (e.g., the coaxial cable network control plane 306, the power line network control plane 312, and/or the wireless network control plane 327 from FIG. 4), an abstraction layer management entity 412, and a CSN port 515 (e.g., a wireless network interface 106, a coaxial cable interface 109, and/or a power line network interface 112 of FIGS. 3A and 3B). The hybrid network device 503 includes, for example, a CSN port control entity 518, an abstraction layer entity 521, a CSN port 524, and an Ethernet port 527. The CSN network device 506 includes, for example, a bridging protocol entity 530, an abstraction layer entity 533, and a CSN port 536. The Ethernet network device 509 includes, for example, a bridging protocol entity 539 and an Ethernet port 542.

In this non-limiting example, the hybrid network gateway device 103 and the hybrid network device 503 are connected by way of a coordinated shared network and function as part of a CSN distributed bridge. Configuration messages 545 are sent from the CSN control plane entity 512 through the CSN port 515 to the CSN port 524 and to the CSN port control entity 518, thereby implementing the distributed bridge. The communication involving the configuration messages is indicated on the communication diagram as "CSN Ctrl." In addition, both the hybrid network gateway device 103 and the hybrid network device 503 support the abstraction layer, and abstraction layer configuration messages 548 are sent from the abstraction layer management entity 412 through the CSN port 515 and to the CSN port 524 and onto the abstraction layer entity 521. Such abstraction layer configuration messages 548 may be based at least in part on activity from the bridging protocol entity 406 and/or the CSN control plane entity 512.

The abstraction layer configuration messages 548 may also be sent from the abstraction layer management entity 412 and/or the abstraction layer entity 521 to the CSN port 536 and onto the abstraction layer entity 533 of the CSN network device 506. The communication involving the abstraction layer configuration messages 548 is indicated as "AL Ctrl" on the communication diagram 500. It is noted that although the CSN network device 506 does not have a CSN port control entity 518 and does not support the configuration messages 545, the CSN network device 506 may be controlled via a virtual port entity 418 (FIG. 4) and the abstraction layer configuration messages 548.

The Ethernet network device 509 in this non-limiting example, may not have a CSN port control entity or an abstraction layer entity. Consequently, the Ethernet network device 509 may not receive configuration messages 545 or abstraction layer configuration messages 548. However, the Ethernet network device 509 may receive bridging protocol control frames 551. The bridging protocol control frames 551 may be forwarded, for example, by the hybrid network device 503 between the coordinated shared network and the Ethernet network. The communication involving the bridging protocol control frames 551 is indicated on the communication diagram 500 as "Bridging." Although the hybrid network device 503 does receive and forward the bridging protocol control frames 551, the hybrid network device 503 in this example does not have a bridging protocol entity because the control plane is maintained in the hybrid network gateway device 103.

Figure 6:
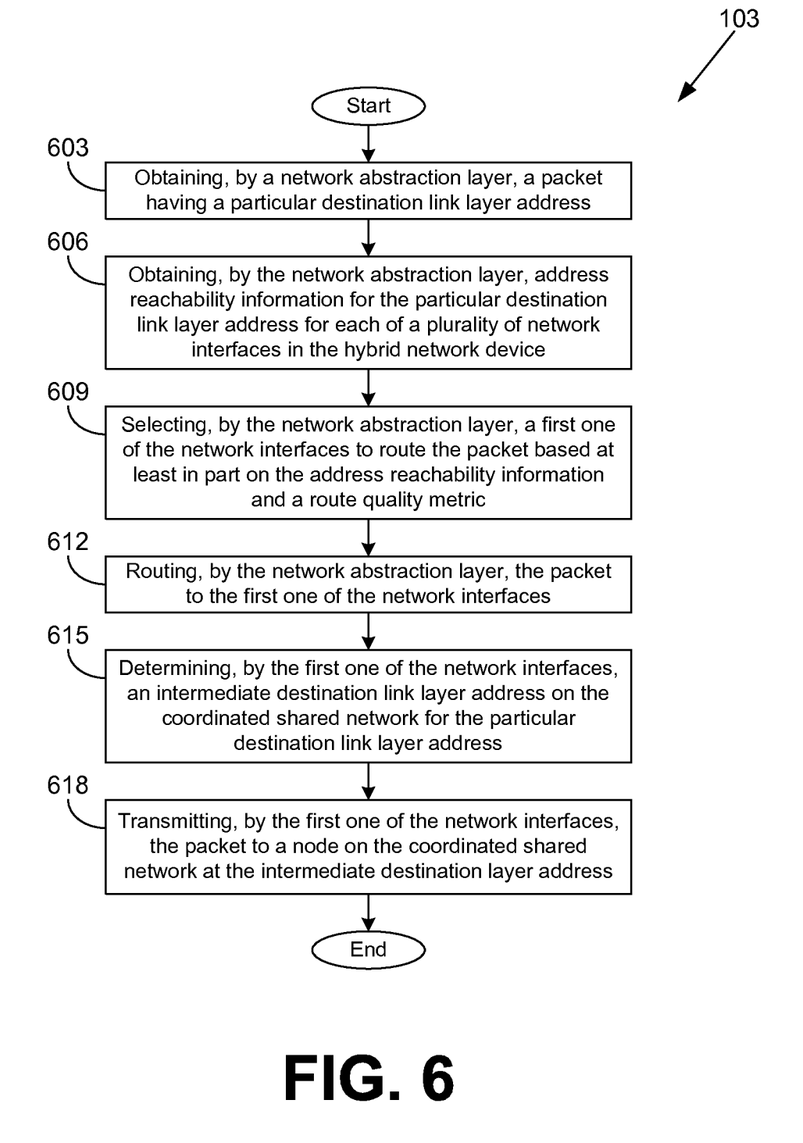
FIG. 6 is a flowchart that provides one example of the operation of another portion of the hybrid network gateway device in the exemplary hybrid network of FIGS. 3A and 3B according to various embodiments of the present disclosure.

FIG. 6 is a flowchart that provides one example of the operation of a portion of the hybrid network gateway device 103 in the exemplary hybrid network 300 of FIGS. 3A and 3B according to various embodiments of the present disclosure. It is understood that the flowchart of FIG. 6 provides merely an example of the many different types of functional arrangements that may be employed to implement the operation of the portion of the hybrid network gateway device 103 as described herein. As an alternative, the flowchart of FIG. 6 may be viewed as depicting an example of steps of a method implemented in the hybrid network gateway device 103 according to one or more embodiments. Although described in the context of a hybrid network gateway device 103, the flowchart of FIG. 6 may be implemented in a hybrid network device without gateway functionality in some embodiments.

Beginning with reference numeral 603, the hybrid network gateway device 103 obtains a packet having a particular destination link layer address using a network abstraction layer 121 (FIG. 1). The packet may be obtained from an upper layer entity or through any one of the interfaces of the hybrid network gateway device 103 (e.g., the wireless network interface 106 (FIG. 1), the coaxial cable network interface 109 (FIG. 1), the power line network interface 112 (FIG. 1), the external network interface 115 (FIG. 1), etc.). In reference numeral 606, the hybrid network gateway device 103 obtains, by way of the abstraction layer 121, address reachability information for the particular destination link layer address for each of multiple network interfaces in the hybrid network gateway device 103.

In reference numeral 609, the hybrid network gateway device 103 selects, by the abstraction layer 121, a first one of the network interfaces to route the packet based at least in part on the address reachability information and a route quality metric. The route quality metric enables the selection of a best route from multiple routes that may be available according to the address reachability information. The first one of the network interfaces is coupled to a coordinated shared network, e.g., the power line network 151 (FIG. 1), the wireless network 124 (FIG. 1), the coaxial cable network 133 (FIG. 1), etc. In reference numeral 612, the abstraction layer 121 routes the packet to the first one of the network interfaces.

In reference numeral 615, the hybrid network gateway device 103 determines, in the first one of the network interfaces, an intermediate destination link layer address on the coordinated shared network for the particular destination link layer address. It is noted that the abstraction layer 121 does not need to be aware of the intermediate destination link layer address or the underlying technology on the coordinated shared network. This is because the coordinated shared network is modeled as a bridge according to the principles of the present disclosure. In reference numeral 618, the first one of the network interfaces in the hybrid network gateway device 103 transmits the packet to a node on the coordinated shared network at the intermediate destination layer address. Thereafter, the portion of the hybrid network gateway device 103 ends.

Figure 7:
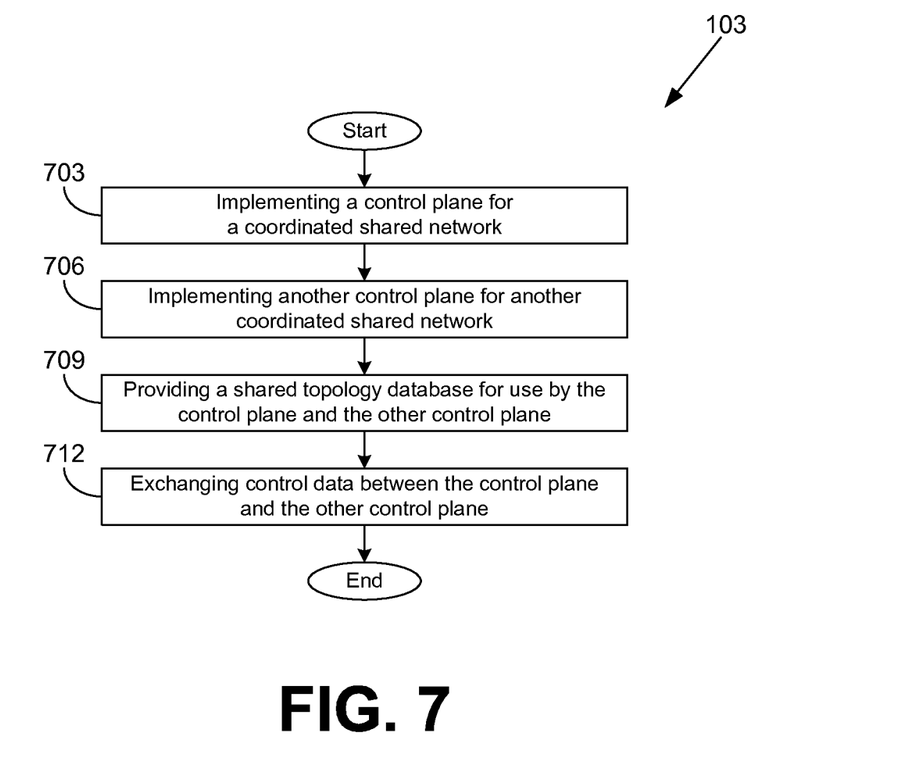
FIG. 7 is a flowchart that provides one example of the operation of a portion of the hybrid network gateway device in the exemplary hybrid network of FIGS. 3A and 3B according to various embodiments of the present disclosure.

FIG. 7 is a flowchart that provides one example of the operation of another portion of the hybrid network gateway device 103 in the exemplary hybrid network 300 of FIGS. 3A and 3B according to various embodiments of the present disclosure. It is understood that the flowchart of FIG. 7 provides merely an example of the many different types of functional arrangements that may be employed to implement the operation of the other portion of the hybrid network gateway device 103 as described herein. As an alternative, the flowchart of FIG. 7 may be viewed as depicting an example of steps of a method implemented in the hybrid network gateway device 103 according to one or more embodiments. Although described in the context of a hybrid network gateway device 103, the flowchart of FIG. 7 may be implemented in a hybrid network device without gateway functionality in some embodiments.

Beginning with reference numeral 703, the hybrid network gateway device 103 implements a control plane for a coordinated shared network. In reference numeral 706, the hybrid network gateway device 103 implements another control plane for another coordinated shared network. For example, the hybrid network gateway device 103 may implement two or more of the following: a coaxial cable network control plane 306 (FIG. 3A), a power line network control plane 312 (FIG. 3A), a wireless network control plane 327 (FIG. 3B), or control planes for other coordinated shared networks. In reference numeral 709, the hybrid network gateway device 103 provides a shared topology database 409 (FIG. 4) for use by the control plane and the other control plane. In reference numeral 712, the hybrid network gateway device 103 exchanges control data between the control plane and the other control plane. Thereafter, the other portion of the hybrid network gateway device 103 ends.

Figure 8:
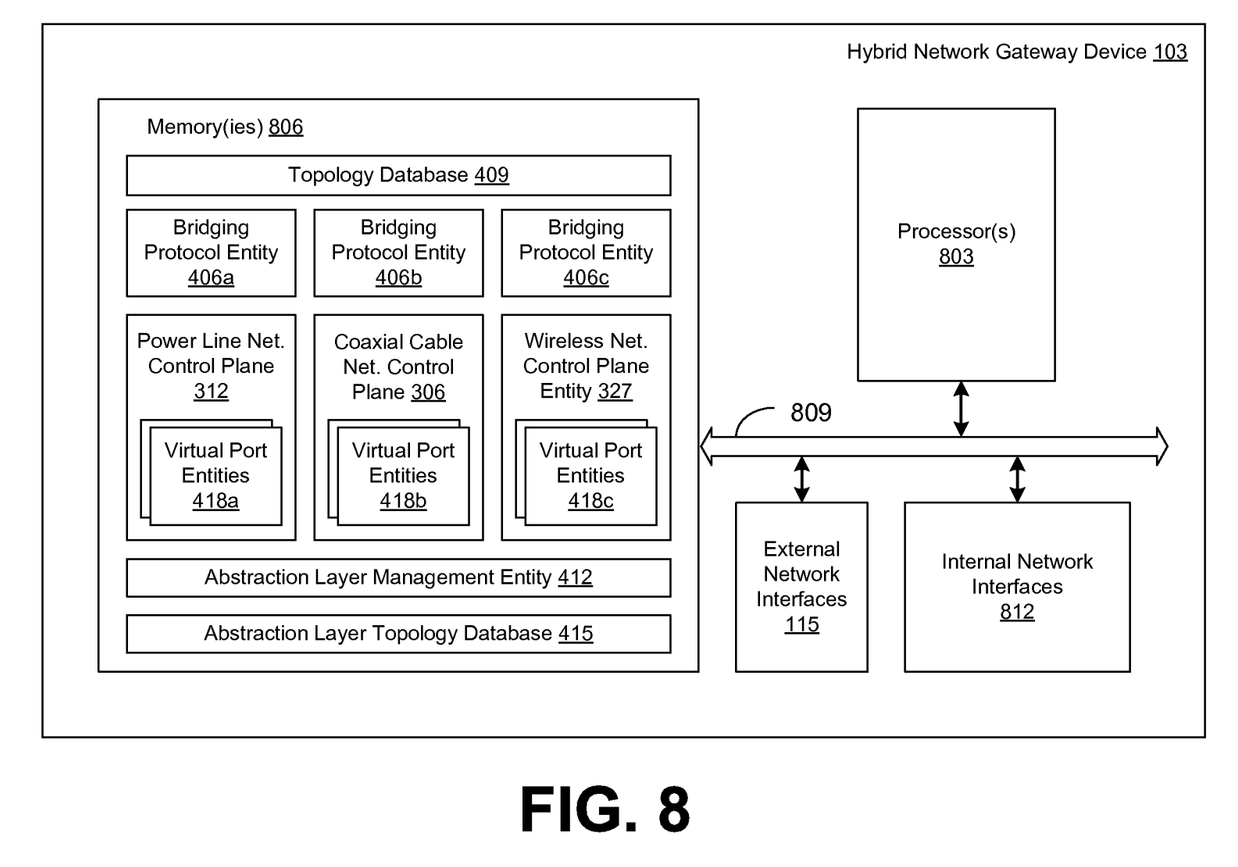
FIG. 8 shows an exemplary schematic block diagram of the hybrid network gateway device employed in the exemplary hybrid network of FIGS. 3A and 3B according to various embodiments of the present disclosure.

FIG. 8 shows an exemplary schematic block diagram of the hybrid network gateway device 103 employed in the exemplary hybrid network 300 of FIGS. 3A and 3B according to various embodiments of the present disclosure. The hybrid network gateway device 103 includes at least one processor circuit, for example, having a processor 803 and a memory 806, both of which are coupled to a local interface 809. To this end, the hybrid network gateway device 103 may comprise, for example, a network gateway device, a server device, a router, and/or other types of computing devices. The local interface 809 may comprise, for example, a data bus with an accompanying address/control bus or other bus structure as can be appreciated. One or more external network interfaces 115 and one or more internal network interfaces 812 may be coupled to the local interface 809. The internal network interfaces 812 may comprise, for example, the wireless network interface 106 (FIG. 1), the coaxial cable network interface 109 (FIG. 1), the power line network interface 112 (FIG. 1), and/or other network interfaces.

Stored in the memory 806 are both data and several components that are executable by the processor 803. In particular, stored in the memory 806 and executable by the processor 803 are the power line network control plane 312, the coaxial cable network control plane 306, the wireless network control plane 327, the virtual port entities 418a, 418b, and 418c, the abstraction layer management entity 412, the abstraction layer topology database 415, the topology database 409, the bridging protocol entities 406a, 406b, and 406c, and potentially other logic. Also stored in the memory 806 may be forwarding tables and other data. In addition, an operating system may be stored in the memory 806 and executable by the processor 803.

One or more software components may be stored in the memory 806 and may be executable by the processor 803. In this respect, the term "executable" means a program file that is in a form that can ultimately be run by the processor 803. Examples of executable programs may be, for example, a compiled program that can be translated into machine code in a format that can be loaded into a random access portion of the memory 806 and run by the processor 803, source code that may be expressed in proper format such as object code that is capable of being loaded into a random access portion of the memory 806 and executed by the processor 803, or source code that may be interpreted by another executable program to generate instructions in a random access portion of the memory 806 to be executed by the processor 803, etc. An executable program may be stored in any portion or component of the memory 806 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 806 is defined herein as including both volatile and nonvolatile memory and data storage components. Volatile components are those that do not retain data values upon loss of power. Nonvolatile components are those that retain data upon a loss of power. Thus, the memory 806 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 803 may represent multiple processors 803 and the memory 806 may represent multiple memories 806 that operate in parallel processing circuits, respectively. In such a case, the local interface 809 may be an appropriate network that facilitates communication between any two of the multiple processors 803, between any processor 803 and any of the memories 806, or between any two of the memories 806, etc. The local interface 809 may comprise additional systems designed to coordinate this communication, including, for example, performing load balancing. The processor 803 may be of electrical or of some other available construction.

Although the various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowcharts of FIGS. 6 and 7 show the functionality and operation of an implementation of portions of the hybrid network gateway device 103. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 803 in a computer system or other system. The machine code may be converted from the source code, etc. If embodied in hardware, each block may represent a circuit or a number of interconnected circuits to implement the specified logical function(s).

Although the flowcharts of FIGS. 6 and 7 show a specific order of execution, it is understood that the order of execution may differ from that which is depicted. For example, the order of execution of two or more blocks may be scrambled relative to the order shown. Also, two or more blocks shown in succession in FIGS. 6 and 7 may be executed concurrently or with partial concurrence. Further, in some embodiments, one or more of the blocks shown in FIGS. 6 and 7 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein that comprises software or code can be embodied in any non-transitory computer-readable medium for use by or in connection with an instruction execution system such as, for example, a processor 803 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, at least the following is claimed:

1. A hybrid network device, comprising:
    a plurality of network interfaces coupled to a plurality of networks, wherein a first one of the networks and a second one of the networks employ heterogeneous networking technologies;
    a plurality of control planes implemented in the plurality of networks, wherein at least two of the control planes are associated with different heterogeneous networking technologies; and
    a network abstraction layer configured to route a packet having a particular destination link layer address associated with a first external device to one of the network interfaces based on address reachability information and a route quality metric, the network abstraction layer configured to determine a plurality of available routes through which the packet can be transmitted to the first external device using the address reachability information and to select one of the plurality of available routes through which to transmit the packet using the route quality metric, the network abstraction layer unaware of an intermediate destination link layer address associated with a second external device on the first one of the networks to which the one of the network interfaces is configured to route the packet;
    wherein the first one of the networks corresponds to a coordinated shared network implementing a first control plane in a first node of the coordinated shared network, the first control plane associated with a first heterogeneous networking technology;
    wherein the first node corresponds to a different network device in communication with the hybrid network device by way of the coordinated shared network; and
    wherein the network abstraction layer of the hybrid network device is configured to receive first control frames and abstract access to and from the first control plane through a first network interface associated with the first heterogeneous networking technology.

2. The hybrid network device of claim 1, wherein another node of the coordinated shared network corresponds to a virtual port entity in the control plane.

3. The hybrid network device of claim 1, wherein a node of the coordinated shared network corresponds to a standalone bridge different from the virtual bridge.

4. The hybrid network device of claim 1, wherein the second one of the networks corresponds to an Ethernet network.

5. The hybrid network device of claim 1, further comprising an external network interface coupled to an external network, and the hybrid network device is configured as a gateway to route packets between the networks and the external network.

6. The hybrid network device of claim 1, further comprising:
- a second control plane associated with a second heterogeneous networking technology implemented in the hybrid network device for the second one of the networks;
- a topology database shared by the first control plane and the second control plane; and
- wherein the first one of the networks and the second one of the networks are coordinated shared networks.

7. The hybrid network device of claim 6, wherein the first control plane and the second control plane employ a single routing protocol.

8. The hybrid network device of claim 6, further comprising:
- a third control plane implemented in the hybrid network device for the network abstraction layer; and
- wherein the third control plane is configured to route control frames between the network abstraction layer and another network abstraction layer implemented in another hybrid network device coupled to one of the networks.

9. The hybrid network device of claim 1, further comprising:
- a second control plane associated with a second heterogeneous networking technology implemented in the hybrid network device for the second one of the networks, the second one of the networks being a coordinated shared network; and
- wherein the second control plane is configured to regard at least one node on the first one of the networks as an external bridge.

10. A hybrid network gateway device, comprising:
- an external network interface coupled to an external network;
- a plurality of internal network interfaces coupled to a plurality of coordinated shared networks using heterogeneous networking technologies;
- a respective control plane for one or more of the plurality of internal network interfaces;
- a network abstraction layer configured to select one of the plurality of internal network interfaces through which to transmit a packet having a destination link layer address associated with a first external device based on address reachability information and a route quality metric, the network abstraction layer configured to determine a plurality of available routes through which the packet can be transmitted to the first external device using the address reachability information and to select one of the plurality of available routes through which to transmit the packet using the route quality metric; and
- a topology database shared by the control planes for each of the plurality of internal network interfaces, wherein each of the control planes is associated with a different heterogeneous networking technology;
- wherein a control plane for at least one of the plurality of internal network interfaces is implemented in a node of a coordinated shared network other than the hybrid network gateway device, and wherein the hybrid network gateway device is connected to the node via the coordinated shared network.

11. A method comprising:
- obtaining, by a network abstraction layer of a hybrid network device, a packet having a particular destination link layer address;
- obtaining, by the network abstraction layer, address reachability information for the particular destination link layer address for each of a plurality of network interfaces in the hybrid network device, the address reachability information indicating a plurality of routes through which the packet can be transmitted;
- selecting, by the network abstraction layer, a first one of the network interfaces to route the packet based at least in part on the address reachability information and a route quality metric indicative of a quality associated with each of the plurality of routes through which the packet can be transmitted, the first one of the network interfaces being coupled to a coordinated shared network;
- routing, by the network abstraction layer, the packet to the first one of the network interfaces;
- determining, by the first one of the network interfaces, an intermediate destination link layer address on the coordinated shared network for the particular destination link layer address; and
- transmitting, by the first one of the network interfaces, the packet to a node on the coordinated shared network at the intermediate destination layer address;
- implementing, in the hybrid network device, a first control plane for a first coordinated shared network, wherein the first control plane is associated with a first heterogeneous networking technology; and
- implementing, in a first node corresponding to a different network device in communication with the hybrid network device by way of a second coordinated shared network, a second control plane for the second coordinated shared network, wherein the second control plane is associated with a second heterogeneous networking technology; and
- receiving, in the hybrid network device, control frames associated with the second coordinated shared network and routing the control frames to the second control plane of the first node.

12. The method of claim 11, wherein the intermediate destination link layer address is not exposed to the network abstraction layer, the particular destination link layer address associated with a first external device, and the intermediate destination link layer address associated with a second external device.

13. The method of claim 11, further comprising obtaining, by the network abstraction layer, the packet from a second one of the network interfaces.

14. The method of claim 11, further comprising obtaining, by the network abstraction layer, the packet from an upper layer entity.

15. The method of claim 11, further comprising implementing, in the hybrid network device, a third control plane for another coordinated shared network coupled to a second one of the network interfaces.

16. The method of claim 15, further comprising providing, in the hybrid network device, a shared topology database for use by the first control plane and the third control plane.

17. The method of claim 15, further comprising exchanging control data between the first control plane and the third control plane within the hybrid network device, wherein the first control plane and the third control plane are associated with different heterogeneous networking technologies.

18. The hybrid network device of claim 1, wherein the plurality of heterogeneous networking technologies comprise two or more of coaxial cable networks, power line networks, Wi-Fi wireless networks, or Ethernet networks.

19. The hybrid network gateway device of claim 10, wherein the plurality of heterogeneous networking technologies comprise two or more of coaxial cable networks, power line networks, Wi-Fi wireless networks, or Ethernet networks.

20. The method of claim 11, wherein the plurality of heterogeneous networking technologies comprise two or more of coaxial cable networks, power line networks, Wi-Fi wireless networks, or Ethernet networks.

* * * * *